J. C. WILSON.
METER.
APPLICATION FILED AUG. 1, 1913.

1,254,871.

Patented Jan. 29, 1918.
2 SHEETS—SHEET 1.

Witnesses:

Inventor
John C. Wilson

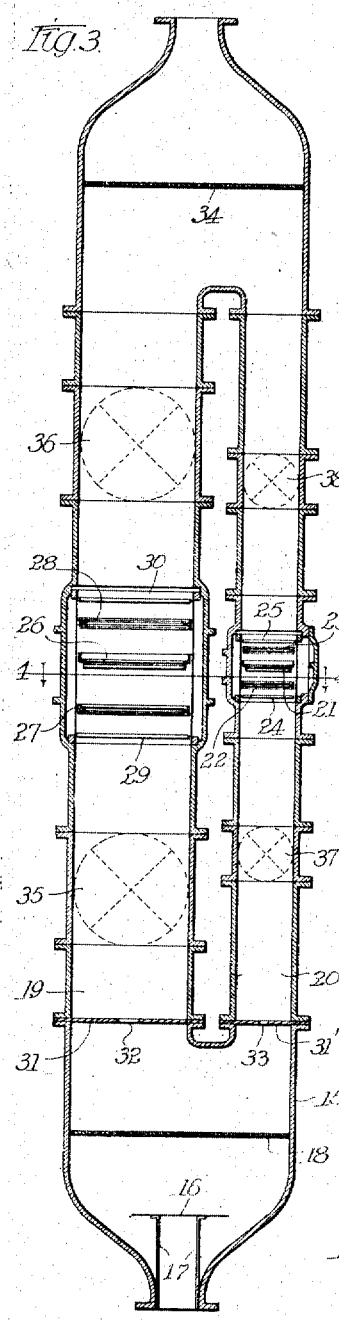
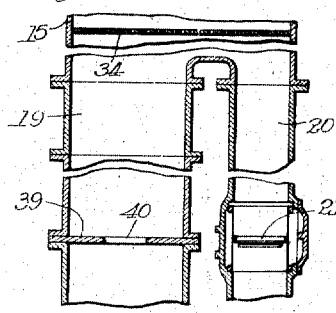
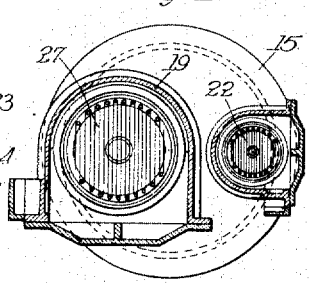
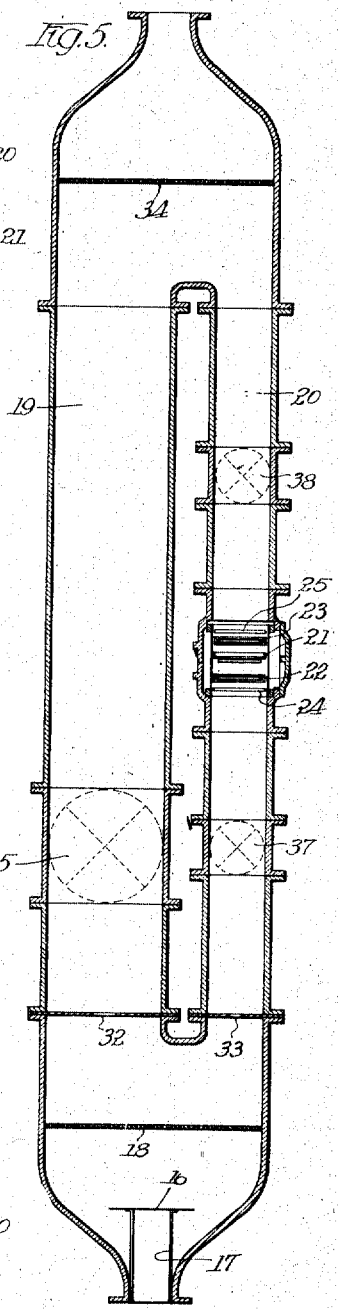
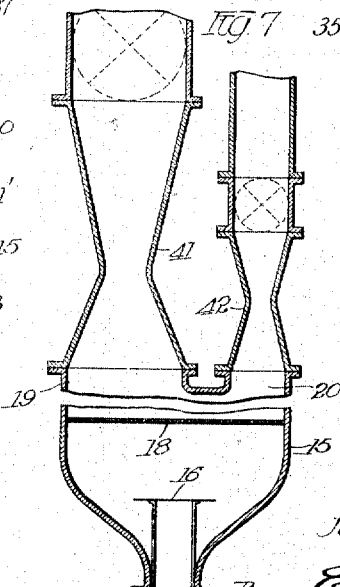

UNITED STATES PATENT OFFICE.

JOHN C. WILSON, OF MILWAUKEE, WISCONSIN, ASSIGNOR TO THE CUTLER-HAMMER MFG. CO., OF MILWAUKEE, WISCONSIN, A CORPORATION OF WISCONSIN.

METER.

1,254,871.

Specification of Letters Patent.  Patented Jan. 29, 1918.

Application filed August 1, 1913. Serial No. 782,427.

*To all whom it may concern:*

Be it known that I, JOHN C. WILSON, a citizen of the United States, residing at Milwaukee, in the county of Milwaukee and State of Wisconsin, have invented new and useful Improvements in Meters, of which the following is a full, clear, concise, and exact description, reference being had to the accompanying drawing, forming a part of this specification.

My invention relates to improvements in meters.

Wherever it is necessary to measure very large quantities of gas or other fluid it has been recognized generally that it is desirable to direct a small portion of the flowing fluid through a by-pass and measure the flow thus diverted from the main body of fluid. The total flow may then be estimated if the ratio of the quantity of diverted fluid to the main body of fluid is known or can be determined. It has been very difficult heretofore to determine and maintain accurately the ratio of the quantity of fluid by-passed to the total quantity of fluid, and for this reason, measurements based on this method have not been satisfactory. Among the various difficulties encountered it may be mentioned that when a meter is located in the by-pass, the resistance offered thereby to the flow of fluid causes a deviation from the proportion of flow which would otherwise take place; if the error just mentioned is corrected by making a suitable calibration at some particular rate of flow, said correction does not hold for a different rate of flow; if the error is corrected by making a suitable calibration when all the passages are clean, said correctiton or calibration does not hold after dirt, tar, rust, etc., has been deposited on the parts and passages. The above objectionable features have been found to exist particularly where measuring elements are used which depend for their operation upon the pressure of the fluid against them. They are also known to exist to some extent when the measuring element is of a type such as described in the United States patent to Carl C. Thomas, No. 946,886, January 18, 1910, in which the flow is measured by the determination of the effect of a known amount of heat dissipated into the flowing gas. In using a meter of this type it is particularly desirable, when very large quantities of gas are to be measured, to use the proportional method of measurement, as without such arrangement the electrical energy required to heat such large quantities of gas would involve considerable expense.

My improvement is directed more particularly toward proportional meters wherein the meter elements are of the electrical type referred to in said patent, although the invention is, of course, not limited to any particular type of meter elements.

The object of my invention, generally speaking, is to provide a proportional meter of increased accuracy and efficiency.

Other contributory objects are:

To provide means for dividing the flow into fixed, definite proportional parts.

To provide means for insuring the continuance of the flow accurately in the proportions determined upon.

To provide means for checking the proportional flow at intervals to insure the continued accuracy of the readings.

To provide an improved meter which shall measure accurately the flow of very large quantities of fluid, at a minimum expense.

To provide an improved meter which shall have a very wide range of operation, whereby the same meter may be used to measure the flow of either a large quantity or a small quantity of fluid with a high degree of accuracy.

To provide a meter having proportioning means independent of the metering elements.

To provide a meter wherein the measuring elements may be cleaned or otherwise removed from service without interrupting the flow, which continues through the remaining passages.

Additional objects will be apparent without specific enumeratiton in view of the following description.

In the accompanying drawings I have illustrated several embodiments of my invention. Various other embodiments may be devised, however, and accordingly I do not limit myself to the present disclosure.

In the drawings:

Fig. 3 is a longitudinal sectional elevation of a different form of proportionate meter.

Fig. 4 is a section thereof on the line 4, 4 of Fig. 3.

Fig. 5 is a sectional elevation of a slight modification of the meter shown in Fig. 3.

Fig. 6 is a partial sectional elevation of a further modification.

Fig. 7 is a partial sectional elevation of an additional modification.

Figure 1:
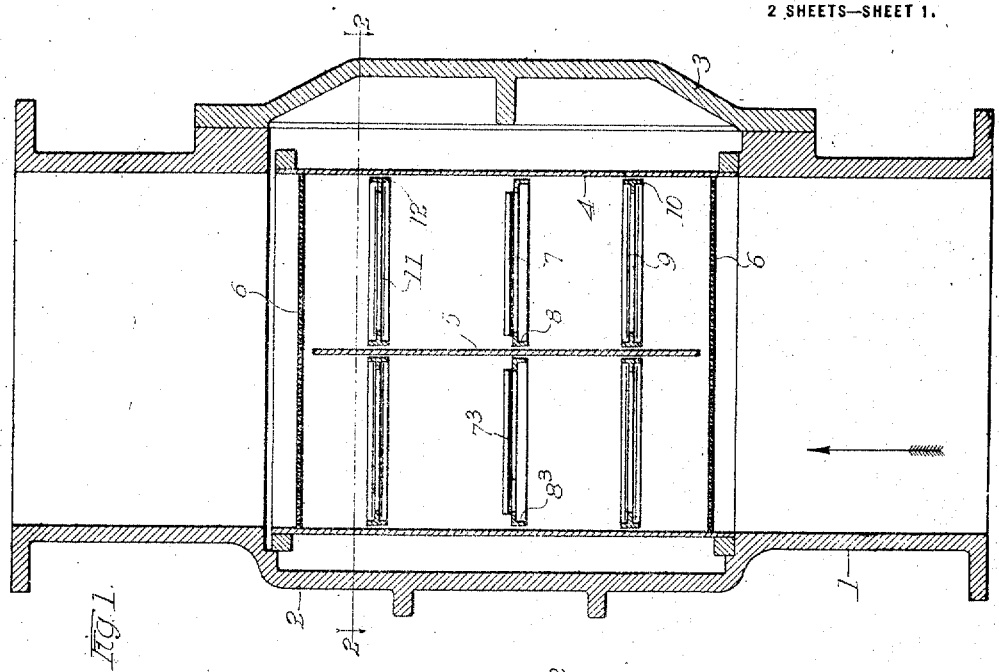
Figure 1 is a longitudinal sectional elevation of one form of proportional meter.

Referring to Fig. 1, the meter housing 1 is adapted to be connected directly in the main conduit through which the gas or other fluid flows. The middle portion of the housing 1 is enlarged at 2 and is provided with a removable cover 3. Within the inclosure thus formed is mounted an inner barrel or cylinder 4 arranged preferably vertically, the latter being divided preferably by radial partitions 5 into a plurality of substantially parallel passages. In the present instance there are four such passages, each of equal cross-sectional area, through which the fluid would ordinarily flow in equal volumes, one-fourth of the entire volume of fluid flowing through each passage. Of course, the number of passages may be varied within wide limits. At each end of the barrel 4, I provide preferably a screen 6, to render the flow through the passages more nearly uniform and to screen out any of the larger particles of solid matter which may be floating along in the flowing fluid. It will be seen that with the construction provided, the inner barrel 4 is jacketed by the gas, whereby no substantial errors are introduced due to rapid conduction of heat toward or away from the meter elements through the wall of said inner barrel.

In one of the longitudinal passages I mount meter elements by means of which the flow therethrough may be determined. The metering element or elements may assume various forms. The one which I have illustrated comprises an electric heater 7 consisting of a suitable screen or grid of resistance wire mounted on a suitable frame 8. On one side of said electric heater I arrange a thermometer element 9 consisting of a suitable screen of resistance wire mounted on a support 10. A similar thermometer resistance is mounted on the opposite side of said electric heater and consists of a screen of resistance wire 11 mounted on a suitable support 12.

The heater and thermometer resistances may be of any suitable construction and are not described in detail as they form, per se, no part of the present invention. Suitable circuit connections are made from the two thermometer resistances and the electric heater through conductors 13 to an outlet box 14, whereby by means of automatic apparatus which need not be described herein, heating current is supplied to the electric heater, said current being automatically varied so as to maintain a constant temperature difference, for example, 2 degrees Fahrenheit, between the thermometer resistances located on opposite sides of the heater. The variations in the amount of electrical energy required to maintain this constant temperature difference afford a basis for calculating the quantity of fluid flowing through the passage, irrespective of variations in the temperature and pressure thereof.

The method of determining the flow from the dissipation of heat into the fluid may also be carried out by using the heater alone and omitting the thermometer elements entirely, or by using a heater and a single thermometer element, or by using various other combinations of elements which need not be described at length herein. General reference thereto is made, however, not only to emphasize the fact that many of the features of improvement described herein are independent of the particular measuring apparatus or metering elements employed, but also because of the fact that, generally speaking, the fewer and simpler the metering elements employed, the better because of the diminished resistance or obstruction offered to the flowing fluid. For this reason the use of the heater alone is very advantageous both with the present construction and those hereinafter described, the single heater being illustrated in one of the subsequent figures.

The resistance screens or grids of the heater and two thermometer elements, whether one or more of these devices are employed, offer a certain resistance or obstruction to the flow of fluid and accordingly, with these meter elements mounted in one of said passages, the flow of fluid therethrough would be somewhat slower than that through the three other passages and would therefore be less than the proportion indicated by the ratio of the cross-sectional areas of said passages. In order to offset this difficulty, I mount in the other three passages similar sets of heaters and thermometer elements. These screens are preferably exact duplicates of those with which the measurements are obtained, that is, with respect to the physical dimensions thereof, whereby they offer the same obstruction to the fluid flowing through the passage in which each is located as is offered by the meter elements proper to the fluid flowing through the meter passage. Said heaters and thermometer elements may be merely dummy measuring elements capable of performing no metering function whatever, or they may be connected in circuit in the same manner as the meter elements previously described, whereby the flow through all of the passages may be simultaneously measured at intervals, in order to check up the flow as indicated by the single meter section which is continually in use. With such arrangement a great economy in current is effected and very accurate results may be obtained, as all necessary calibrations may be carefully worked out before installation of the meter and these calibrations may be conveniently checked from time to time as desired during service.

On the assumption that each group of meter elements in each of the passages is not merely a dummy but is an operative device, it will be seen that the flow through the various passages may be measured successively by the respective meter elements. For example, the flow through one passage may be measured by the corresponding instruments for one-half hour, after which, during the next half hour, the flow may be measured through the next adjacent passage, after which the remaining passages may be used in succession. If the respective passages are thus used in rotation, as it may be termed, and the average flow for each passage obtained, the total flow may be readily computed during any desired period.

With any of the above methods of measurement the electrical energy required is very much reduced from what it would be if it were necessary to heat all of the flowing gas. With the improved construction described, it becomes practicable to measure very large volumes of gas, for example, a flow of five million cubic feet per hour, as well as to measure accurately much smaller volumes.

In Fig. 3, I have illustrated a construction embodying certain of the features just described, and having in addition certain other features to aid in determining the proportionate flow. This form of meter comprises a suitable housing 15 of much larger diameter than the diameter of the conduit with which it is connected at both ends, the reduced diameter of said ends giving a general idea of the size of said conduit. At the entrance end of the conduit a baffle 16 is located supported by bars 17, adapted to distribute the gas over the entire cross-section of the casing and prevent it from being concentrated at the middle thereof. The screen 18 also aids in securing uniform distribution. The housing 15 is divided between its ends into a main passage 19 and a by-pass or auxiliary passage 20, the latter being smaller than the former in the construction illustrated. Within the passage 20 suitable meter elements are located consisting in the preferred form of an electric heater 21 and a pair of thermometer resistances 22, 23, together with suitable screens 24, 25, similar to those previously described, whereby the flow of fluid through said passage 20 may be accurately measured. A similar but correspondingly larger set of meter elements is also located in the larger passage 19, said latter elements comprising an electric heater 26, a pair of thermometer resistances 27, 28 and screens 29, 30. These latter elements are so designed as to offer the same proportionate obstruction to the flow of fluid through the larger passage as is offered by the smaller meter elements to the flow of fluid through the smaller passage. The large meter elements may be used to measure the flow occasionally through the large passage for the purpose of calibration and in order to check the proportionate flow. They may, on the other hand, be mere dummies, having no measuring function whatever.

In the lower end of the housing 15, I provide suitable partitions 31 and 31' having openings 32, 33 therein, one substantially in line with the central axis of the large passage and one substantially in line with the central axis of the small passage. One of these orifices is preferably larger than the other, as shown, both being very accurately made and so proportioned as to divide the flowing gas in the desired proportions. They may, of course, be of any desired relative areas. After the gas has flowed through these orifices it flows through the passages 19 and 20. The velocity of flow, however, through these passages is very much reduced, in view of the very large cross-sectional area of the respective passages relative to the diameter of the orifices. Furthermore, the resistance to the flow after the gas has left the orifices is reduced almost to zero, or to a negligible quantity as compared with the resistance to the flow through the orifices. In other words, the main passage and by-pass are designed with such liberal cross-sectional areas, that, comparatively speaking, they do not interfere with the flow of the gas after it leaves said orifices. Under these circumstances, the obstruction offered to the flow of the gas by the meter elements in the small passage is quite negligible and accordingly the dummy elements may be removed, if desired.

An additional screen 34 may be provided at the upper end of the housing to aid in securing an even flow of fluid. Suitable valves 35, 36, 37, 38 may also be provided whereby the flow through either section containing the meter may be shut off and said section removed for cleaning, repairs, etc. It will be seen that during such removal the flow continues without interruption through the remaining passage, and may be measured by the metering elements therein. This advantage obtains not only with a construction such as shown in Fig. 3, having two passages for the fluid, but also in a construction providing for a greater number of passages.

Figure 2:
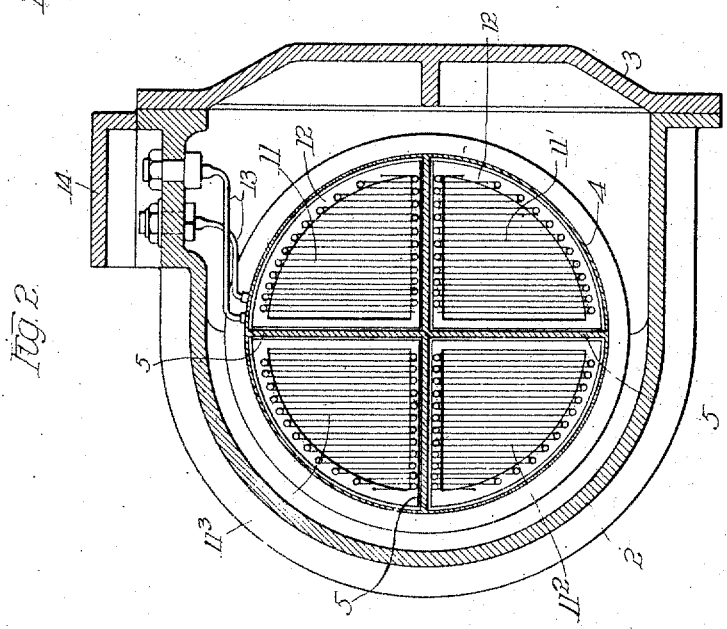
Fig. 2 is a section thereof on the line 2, 2 of Fig. 1.

The plates containing the orifices in Fig. 3, may be omitted, provided the resistance of the meter parts is properly proportioned so that the operation will be similar to that in the construction shown in Figs. 1 and 2. Under such circumstances the passages 19 and 20 should also be designed so as to give the desired proportionate flow or else should be sufficiently large and short so that their effect, in this particular, is negligible.

A construction such as suggested above wherein metering elements are entirely omitted from one of the passages is shown in Fig. 5. In this figure the same reference characters have been used as in Figs. 3 and 4 where corresponding parts are indicated. In both the constructions shown in Figs. 3 and 5, the fluid may be caused to flow through a second pair of orifices near the upper end of the respective passages, if desired; or said outlet orifices may be used to the exclusion of the entrance orifices, the main function being to properly and accurately proportion the flow through the respective passages.

In Fig. 6 I have shown a slight modification wherein instead of dummy metering elements in the passage 19, I substitute other means for obstructing somewhat the flow therethrough, thereby preventing a deviation from the true proportionate flow. The means illustrated is a mechanical resistance having the form of a plate or diaphragm 39, having an opening or orifice 40 therein, said orifice being made of such size when the meter is being calibrated before installation that it offers just sufficient resistance to the flow to bring about the desired proportional division of the total flow. Such a device, or suitable equivalent, may be, of course, used with any of the forms of meter illustrated herein. In the same figure, is shown in the passage 20, a single heater 21 used without the thermometer elements illustrated in the preceding figures. The operation of said heater need not be described other than to state that the fluid flowing past the heater has a cooling or ventilating effect thereon, whereby for a given heat dissipation the temperature, and, hence, the resistance of the heater (where an electric heater is employed), is not as great as it would be with no fluid flowing and whereby variations in said resistance afford a basis of estimating the quantity of said flowing fluid. This single heater may, of course, be employed in any of the other forms of meter illustrated herein.

In Fig. 7 I have illustrated a further modification wherein, instead of the orifices heretofore described, I have substituted restricted openings in the form of a Venturi throat. A large Venturi throat or tube 41 is connected in the passage 19 and a corresponding smaller Venturi tube 42 is connected in the passage 20, said tubes giving the desired proportional flow without appreciable drop in pressure, in view of the well known properties of said tubes. Accordingly greater efficiency may be attained by the use of these devices as there is not as much drop in pressure in the fluid passing through the meter. This construction also may be employed with the various different forms of meters illustrated herein.

In connection particularly with the forms of meter illustrated in Fig. 3 and the various modifications thereof, it will be seen that provision is made whereby the range of the meter is very great. For example, suppose the proportional factor of the two passages is 10 to 1, and assume that the measuring element has a range of accuracy of from 1 to 20. Assume also that the meter element in the small passage is designed on this basis to measure rates of flow from 5,000 to 100,000 cubic feet per hour. With the large passage shut off entirely, the entire flow may be directed through the small passage and measured accurately therein provided it is within the limits of from 5,000 to 100,000 cubic feet per hour. The range of the meter when both passages are open will then be ten times as great, or from 50,000 to 1,000,000 cubic feet per hour. The total possible range of the combination, therefore, is from 5,000 to 1,000,000 cubic feet per hour—a total range of from 1 to 200. The above very wide range is possible where only two passages are provided. Of course, where the fluid is divided up into more than two streams the possibilities in this regard are much increased. From this it is apparent, of course, that the construction illustrated in Figs. 1 and 2 may be suitably modified to give a wide range of capacity for the meter in a similar manner.

Although all the metering elements shown are of the electric type, it is apparent that in many of its phases the invention is not limited to this type of element. Furthermore, although the straight flow type of housing for the meter is shown in all the drawings, the globe valve type or any one of a number of other types might also be employed. In general, therefore, the invention is not limited to the structures described and illustrated, but may be embodied in other forms and accordingly, I desire to cover by the appended claims whatever suitable equivalent constructions may be devised which fall within the scope of said claims.

Having thus described my invention, what I claim as new and desire to secure by Letters Patent of the United States is:—

1. A meter adapted to divide a flowing stream of fluid into a plurality of proportionate streams, means for measuring the flow of one of said proportionate streams and means for insuring that the proportionality of the streams is maintained, said latter means being adapted to measure the flow in any or all other of said proportionate streams at will.

2. A meter adapted to divide a flowing stream of fluid into a plurality of proportionate streams, electrical means for measuring the flow of one of said proportionate streams, similar means for insuring that the proportionate flow is maintained and for measuring the flow in any or all of the other proportionate streams.

3. A meter adapted to divide a flowing stream of fluid into determinate proportional streams, electrical means in one of said proportionate streams for measuring the flow thereof, and similar electrical measuring means in the other streams for insuring that the proportionality of said streams remains the same and for measuring the flow in any or all of the other proportionate streams.

4. A meter comprising means for dividing a flowing stream of fluid into a plurality of separate streams, an electrical resistance device interposed across the path of flow of one of said separate streams, and additional electrical resistance devices interposed across the path of flow of the remainder of said fluid to offer the same proportionate obstruction thereto as is offered by said first resistance device, whereby any or all of said resistance devices may be used to measure the flow of fluid.

5. A meter for measuring the flow of fluids having a housing provided with a plurality of passages each of which has an entrance orifice of given size, means for insuring uniform distribution of flow adjacent said entrance orifices so that said orifices will divide the flow in accurate proportion and means in one of the passages to measure the proportionate flow therethrough.

6. A meter for measuring the flow of fluids having a housing provided with a plurality of passages each having an entrance orifice of given size, means for insuring uniform distribution of flow adjacent said entrance orifices so that the flow will be divided in accurate proportions by said orifices, means in certain of said passages for measuring the flow therethrough, said orifices being of small area as compared with the cross-sectional area of the corresponding passages so that the proportionate flow is not disturbed by the presence of measuring means in certain of the passages.

7. In a meter, a housing adapted to be connected as part of a conduit, said housing comprising a pair of header chambers connected by a plurality of removable units having passages therethrough communicating with said chambers, measuring means in certain of said units and means for preventing flow through each of said passages so that a unit may be removed and the flow continued through the remaining units.

8. In a meter, a housing having means for connecting it as part of a conduit, said housing comprising a pair of header chambers, a plurality of connecting units having passages therethrough communicating with said chambers, and electrical measuring elements in each of said passages, said units being removable, whereby a unit may be removed and the flow measured by the remaining units.

9. A meter provided with a housing having a plurality of separate passages therethrough, the inclosures for said passages comprising a plurality of connected removable units, means in one of the units of certain of the passages for measuring the flow through said passages and means in other of the units in the passages for interrupting the flow therethrough so that a unit may be removed and the flow continued through the remaining passages.

10. A meter having a housing provided with a pair of header chambers connected by a plurality of separate conduits having sections thereof removable as units, means in certain of said removable units for measuring the flow through the corresponding conduits, means for insuring a proportional flow through said separate conduits and means for preventing flow through each of said conduits so that one or more of the units in a conduit may be removed and the flow continued through the remaining conduits.

11. A meter having a housing provided with a pair of header chambers connected by a plurality of separate passages, baffle plates in said header chambers, said passages having entrance openings of given size to proportion the flow through said passages, said entrance openings being small as compared with the cross-section of said passages, electrical measuring means in certain of said passages to measure the flow therethrough and similar electrical means in the other passages to insure that the proportional flow is maintained under all conditions and to measure the flow through any or all the other passages at will.

12. A meter comprising a housing having a pair of end chambers connected by a plurality of separate passages, certain portions of the inclosures for said passages being removable as units, means in the end chambers for distributing the flow to all of the passages, means for proportioning the flow through each passage, means in certain of the removable units for measuring the flow through the corresponding passages, similar means in the other passages for insuring that the proportionate flow is maintained under all conditions and means in each of the passages for interrupting the flow therethrough so that the removable units may be removed and the flow continued through the remaining passages.

13. A fluid meter having a housing adapted to divide a flowing stream of fluid into a plurality of proportionate streams, means for measuring the flow of one of said proportionate streams including normally stationary parts only in the stream, and flow resisting means in each of the other proportionate streams having parts corresponding in shape and distribution to said stationary parts first named for insuring that the proportionality of the streams remains the same under varying rates of flow.

In witness whereof, I have hereunto subscribed my name in the presence of two witnesses.

JOHN C. WILSON.

Witnesses:
 FRANK H. HUBBARD,
 LEONARD A. WALSON.